(12) United States Patent
Waseda et al.

(10) Patent No.: US 11,353,060 B2
(45) Date of Patent: Jun. 7, 2022

(54) TWO-PIECE ROLLER RETAINER CAGE FOR A ROLLER THRUST BEARING

(71) Applicant: Koyo Bearings North America LLC, Greenville, SC (US)

(72) Inventors: Yoshitaka Waseda, Greenville, SC (US); Trent Carpenter, Anderson, SC (US)

(73) Assignee: Koyo Bearings North America LLC, Greenville, SC (US)

( * ) Notice: Subject to any disclaimer, the term of this patent is extended or adjusted under 35 U.S.C. 154(b) by 31 days.

(21) Appl. No.: 16/761,621

(22) PCT Filed: Nov. 6, 2017

(86) PCT No.: PCT/US2017/060180
§ 371 (c)(1),
(2) Date: May 5, 2020

(87) PCT Pub. No.: WO2019/089058
PCT Pub. Date: May 9, 2019

(65) Prior Publication Data
US 2020/0325935 A1    Oct. 15, 2020

(51) Int. Cl.
*F16C 33/46* (2006.01)
*F16C 19/30* (2006.01)
(Continued)

(52) U.S. Cl.
CPC ........ *F16C 33/4611* (2013.01); *F16C 19/305* (2013.01); *F16C 33/4641* (2013.01);
(Continued)

(58) Field of Classification Search
CPC ............ F16C 19/305; F16C 19/334611; F16C 19/4641; F16C 19/54; F16C 19/542;
(Continued)

(56) References Cited

U.S. PATENT DOCUMENTS 7,390,127 B2 * 6/2008 Kono ................... F16C 33/4611
384/526
8,827,566 B2 * 9/2014 Takemura ............. F16C 33/588
384/621
(Continued)

FOREIGN PATENT DOCUMENTS

CN       1985100 A     6/2007
CN     201448364 U     5/2010
(Continued)

OTHER PUBLICATIONS

International Preliminary Report on Patentability for International Application No. PCT/US20171060180, dated May 15, 2020, 19 pages.
(Continued)

*Primary Examiner* — James Pilkington
(74) *Attorney, Agent, or Firm* — Nelson Mullins Riley & Scarborough LLP

(57) ABSTRACT

A roller retainer cage for a roller thrust bearing, including a first cage half with an annular portion, a first flange extending axially from an inner peripheral edge of the annular portion and a second flange extending axially from an outer peripheral edge of the annular portion, a second cage half including an annular portion, a first flange extending axially from an inner peripheral edge of the annular portion and a second flange extending axially from an outer peripheral edge of the annular portion, wherein the first flange of the first cage half is disposed radially-outwardly of the first flange of the second cage half, the second flange of the first cage half is disposed radially-inwardly of the second flange of the second cage half, and the first cage half is comprised of a through-hardened metal.

11 Claims, 3 Drawing Sheets

(51) Int. Cl.
*F16C 33/54* (2006.01)
*F16C 33/56* (2006.01)

(52) U.S. Cl.
CPC ............ *F16C 33/547* (2013.01); *F16C 33/56* (2013.01); *F16C 33/565* (2013.01); *F16C 2202/04* (2013.01); *F16C 2223/12* (2013.01)

(58) Field of Classification Search
CPC ...... F16C 19/547; F16C 19/56; F16C 19/565; F16C 33/4611; F16C 33/4641; F16C 33/54; F16C 33/542; F16C 33/547; F16C 33/56; F16C 33/565
See application file for complete search history.

(56) References Cited

U.S. PATENT DOCUMENTS

2005/0185876 A1    8/2005   Yoshiba et al.
2016/0265592 A1*   9/2016   Fugel ..................... F16C 33/56

FOREIGN PATENT DOCUMENTS

| CN | 105658976 A | 6/2016 |
| DE | 19711389 A1 | 9/1998 |
| DE | 102013221363 A1 | 4/2015 |
| EP | 1840395 A1 | 10/2007 |
| JP | 2003232364 A | 8/2003 |
| JP | 2007205521 A | 8/2007 |
| JP | 2009-174579 * | 8/2009 |
| WO | 2009/087957 A1 | 7/2009 |
| WO | 2009087957 A1 | 7/2009 |
| WO | WO2012/017860 * | 2/2012 |

OTHER PUBLICATIONS

International Search Report and Written Opinion for International Application No. PCT/US2017/060180 dated Jul. 13, 2018.

* cited by examiner

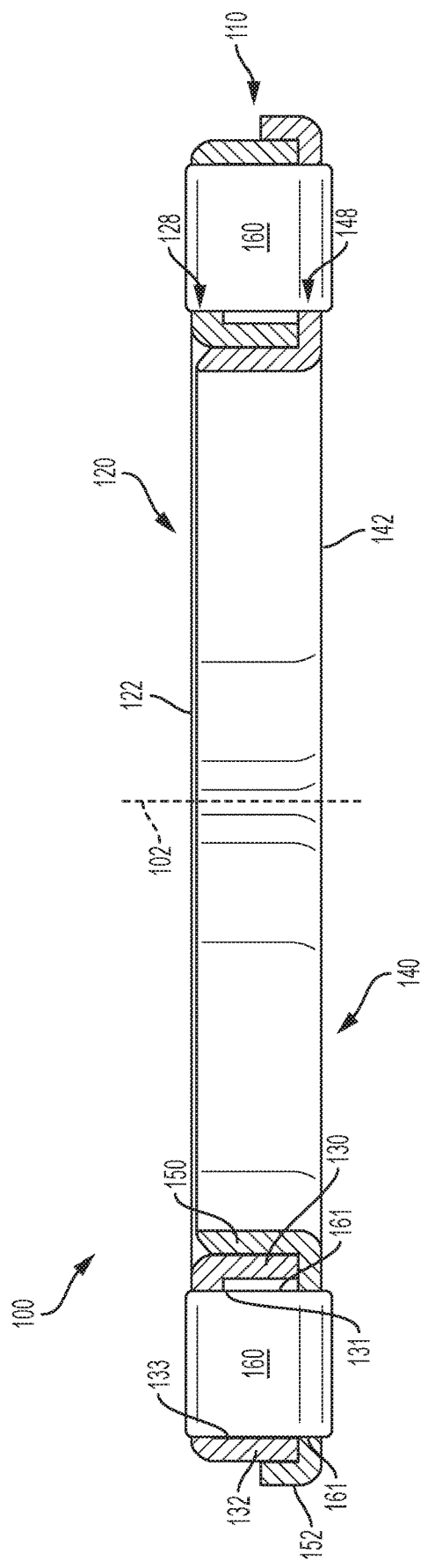
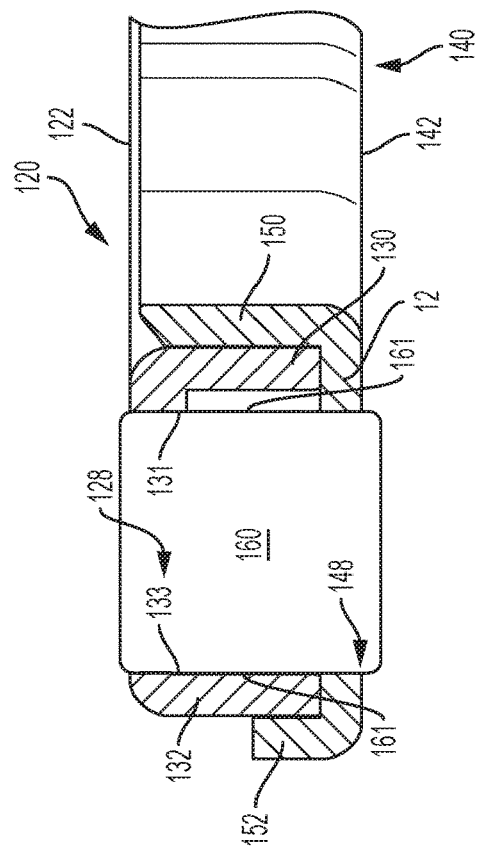
FIG. 1A
FIG. 1B

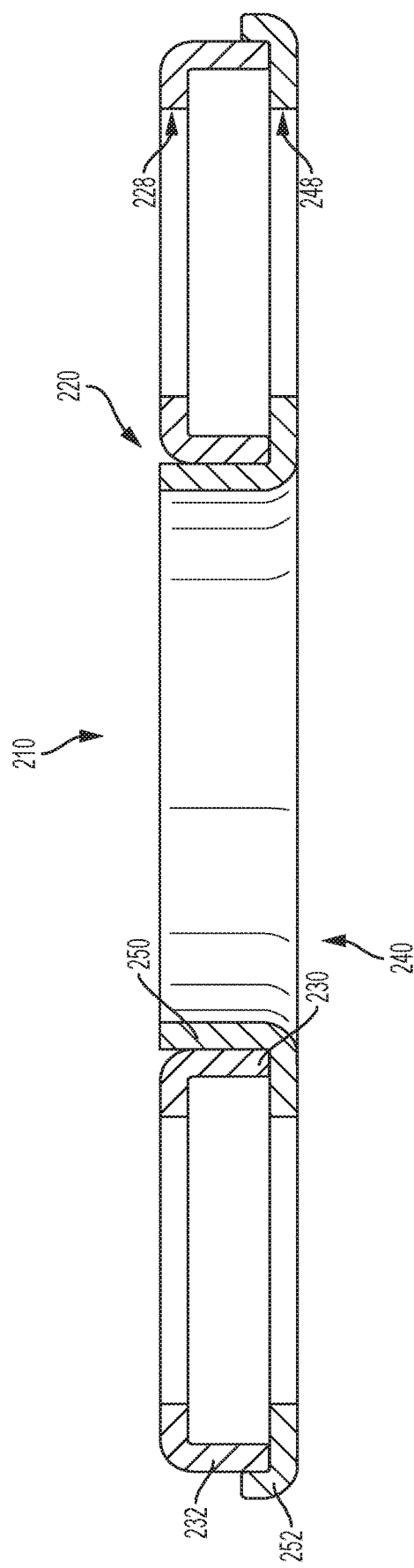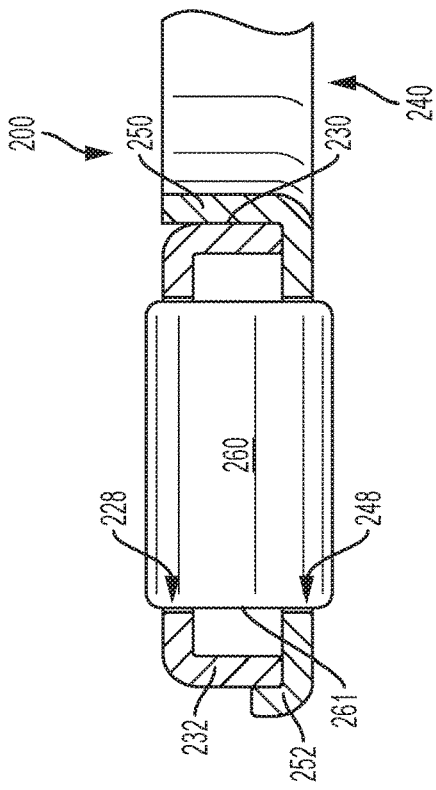
FIG. 2A
FIG. 2B

TWO-PIECE ROLLER RETAINER CAGE FOR A ROLLER THRUST BEARING

RELATED APPLICATION

This is a 35 U.S.C. § 371 national stage application of PCT/US2017/060180, filed Nov. 6, 2017, the entire disclosure of which is incorporated herein.

FIELD OF THE INVENTION

The present invention relates generally to roller thrust bearings. More particularly, the present invention relates to a two-piece roller retainer cage for use in a roller thrust bearing.

BACKGROUND OF THE INVENTION

As is known in the art, roller thrust bearings typically include a roller cage including a first cage half and a second cage half that include pairs of interlocking flanges that maintain the roller retainer cage in a unified state. A material often used in manufacturing this type of roller retainer cage is SAE 1010 steel, especially in high speed applications such as air conditioning (AC) compressors. Referring additionally to FIG. 3A, a preferred heat treatment for the cage halves in such applications is case carburizing, which results in a case depth layer 10 (hard zone) protecting a soft core 12 (soft zone) of the corresponding cage half 14.

Potential issues, such as drilling wear, may arise between an end face 16 of a roller 18 and the adjacent surface of the corresponding cage half 14. Drilling wear can be especially problematic under high speed, high temperature conditions in which inadequate lubrication exists. As shown in FIG. 3B, drilling wear is accelerated once the roller end face 16 wears through case depth layer 10 and enters soft core 12. Drilling wear is often most prevalent between the radially-outermost end faces of the rollers and the flanges of the corresponding retainer. It is known to use through-hardened materials such as, but not limited to, 1074 steel with standard heat treatments (SHT). However, use of through-hardened materials can lead to cracking of the cage halves when they are crimped during the assembly process.

The present invention recognizes and addresses considerations of prior art constructions and methods.

SUMMARY OF THE INVENTION

One embodiment of the present invention provides a roller retainer cage for a roller thrust bearing, including a first cage half with an annular portion, a first flange extending axially from an inner peripheral edge of the annular portion and a second flange extending axially from an outer peripheral edge of the annular portion, a second cage half including an annular portion, a first flange extending axially from an inner peripheral edge of the annular portion and a second flange extending axially from an outer peripheral edge of the annular portion, wherein the first flange of the first cage half is disposed radially-outwardly of the first flange of the second cage half, the second flange of the first cage half is disposed radially-inwardly of the second flange of the second cage half, and the first cage half is comprised of a through-hardened metal.

Another embodiment of the present invention provides a roller thrust bearing including a first cage half with an annular portion defining a plurality of roller pockets, a first flange extending axially from an inner peripheral edge of the annular portion and a second flange extending axially from an outer peripheral edge of the annular portion, a second cage half including an annular portion defining a plurality of roller pockets, a first flange extending axially from an inner peripheral edge of the annular portion and a second flange extending axially from an outer peripheral edge of the annular portion, and a plurality of roller elements, each roller element being rotatably received in a corresponding roller pocket of both the first cage half and the second cage half, wherein the second flange of the first cage half is disposed radially-inwardly of the second flange of the second cage half, and the first cage half is comprised of a through-hardened metal.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIGS. 1A and 1B are cross-sectional views of a roller thrust bearing including a two-piece roller retainer cage in accordance with an embodiment of the present invention;

FIGS. 2A and 2B are cross-sectional views of a roller thrust bearing including a two-piece roller retainer cage in accordance with an alternate embodiment of the present invention.

Figure 3A:
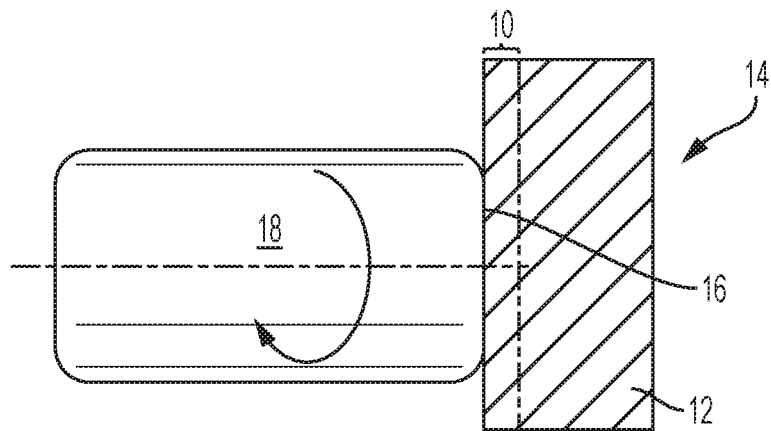
FIGS. 3A and 3B are partial cross-sectional views of a two-piece roller retainer cage in a roller thrust bearing.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, a roller thrust bearing 100 in accordance with the present invention includes a roller retainer cage 110 formed by a first cage half 120 and a second cage half 140, and a plurality of roller elements 160 rotatably received therebetween as best seen in FIGS. 1A and 1B. As shown, roller retainer cage 110 is a wrap-around spin cage design. First cage half 120 includes an annular portion 122 defining a plurality of roller pockets 128, a first annular flange 130 extending axially (parallel to longitudinal center axis 102) from its inner peripheral edge, and a second annular flange 132 extending axially from its outer peripheral edge. Annular portion 122 of first cage half 120 is substantially disc-shaped, with the inner peripheral edge and the outer peripheral edge being substantially concentric about the longitudinal center axis 102 of roller retainer cage 110. As shown, first annular flange 130 and second annular flange 132 are preferably of the same height and concentric about longitudinal center axis 102 as well.

As shown, second cage half 140 includes an annular portion 142 defining a plurality of roller pockets 148, a first annular flange 150 extending axially (parallel to longitudinal center axis 102) from its inner peripheral edge, and a second annular flange 152 extending axially from its outer peripheral edge. Annular portion 142 of second cage half 140 is substantially disc-shaped, with the inner peripheral edge and the outer peripheral edge being substantially concentric about longitudinal center axis 102 of roller retainer cage 110. As shown, unlike first cage half 120, first annular flange 150 and second annular flange 152 may differ in height although they are concentric about longitudinal center axis 102. Note, however, in alternate embodiments first annular flange 150 and second annular flange 152 may be the same height. Note, first cage half 120 and second cage half 140 preferably have the same material thickness (i.e., their flanges have the same width in the radial direction). However, in alternate embodiments, second cage half 140 may be "thinner" than first cage half 120 as it does not have to bear the friction with the rollers that the flanges of first cage half 120 do.

Figure 3B:
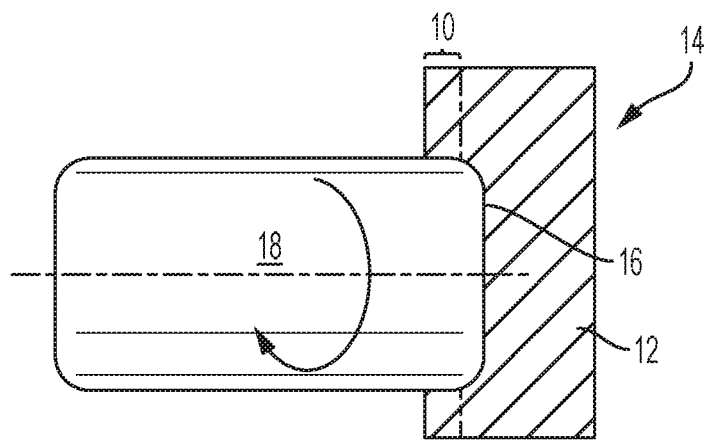

As best seen in FIG. 1B, in a preferred embodiment of roller retainer cage 110, first cage half 120 is through-hardened such that no soft core 12 (FIGS. 3A and 3B) is present under case depth layer 10. Rather, the entire first cage half 120 constitutes a hard zone preferably having a hardness of greater than or equal to HRC55. As such, no accelerated drilling wear will exist as the hardness of the first cage half's first and second flanges 130 and 132 is consistent across their entire thickness. As well, additional surface treatments may be applied to an inner surface 131 of first annular flange 130 and an inner surface 133 of second annular flange 132 to further reduce friction, and therefore wear, between end faces 161 of the roller elements and the adjacent surfaces of the corresponding cage halves. Solid lubricants such as, but not limited to, PTFE (polytetrafluoroethylene) and MoS2 (molybdenum disulfide) may be used, and hard coatings such as, but not limited to, DLC (diamond like carbon) and TiN (titanium nitride) may be used.

In contrast to first cage half 120, second cage half 140 is not through-hardened. Rather, second cage half 140 may undergo carburizing so that it retains a soft core 12 (FIGS. 3A and 3B), thereby allowing second cage half 140 to undergo a crimping process during assembly without cracking. The hardness of the soft zone of second cage half 140 preferably has a value of less than HRC55. As well, alternate embodiments are possible in which second cage half 140 undergoes no heat treatment, or is alternately formed of a polymer rather than a metal. As well, in that first cage half 120 is preferably more resistant to drilling wear than second cage half 140, the radial width of roller pockets 128 defined by first cage half 120 in the radial direction (i.e., along an axis that is transverse to longitude center axis 102 and bisects a corresponding roller pocket) may be selected to be less than the radial width of roller pockets 148 defined by second cage half 140. As such, end faces 161 of roller elements 160 will preferably make contact with the adjacent portions of first cage half 120 rather than the softer second cage half 140.

Referring now to FIGS. 2A and 2B, an alternate embodiment of a roller retainer cage 210 for use in a roller thrust bearing in accordance with the present invention includes a first cage half 220 and a second cage half 240 configured to receive a plurality of roller elements 160 (FIGS. 1A and 1B) rotatably therebetween. As shown, roller retainer cage 210 is a standard spin cage design. Similarly to the first embodiment, first cage half 220 includes an annular portion 222 defining a plurality of roller pockets 228, a first annular flange 230 extending axially (parallel to longitudinal center axis 102) from its inner peripheral edge, and a second annular flange 232 extending axially from its outer peripheral edge. Annular portion 222 of first cage half 220 is substantially disc-shaped, with the inner peripheral edge and the outer peripheral edge being substantially concentric about the longitudinal center axis 102 of roller retainer cage 210. As shown, first annular flange 230 and second annular flange 232 are preferably of the same height and concentric about longitudinal center axis 102 as well.

Second cage half 240 includes an annular portion 242 defining a plurality of roller pockets 248, a first annular flange 250 extending axially (parallel to longitudinal center axis 102) from its inner peripheral edge, and a second annular flange 252 extending axially from its outer peripheral edge. Annular portion 242 of second cage half 240 is substantially disc-shaped, with the inner peripheral edge and the outer peripheral edge being substantially concentric about longitudinal center axis 102 of roller retainer cage 210.

Preferably, first cage half 220 is through-hardened such that no soft core 12 (FIGS. 3A and 3B) is present under case depth layer 10. Rather, the entire first cage half 220 constitutes a hard zone preferably having a hardness of greater than or equal to HRC55. As such, no accelerated drilling wear will exist as the hardness of the first cage half's first and second flanges 230 and 232 is consistent across their entire thickness. Note, first cage half 220 and second cage half 240 preferably have the same material thickness (i.e., their flanges have the same width in the radial direction). However, in alternate embodiments, second cage half 240 may be "thinner" than first cage half 220 as it does not have to bear the friction with the rollers that the flanges of first cage half 220 do.

In contrast to first cage half 220, second cage half 240 is not through-hardened. Rather, second cage half 240 may undergo carburizing so that it retains a soft core 12 (FIGS. 3A and 3B), thereby allowing second cage half 240 to undergo a crimping process during assembly without cracking. The hardness of the soft zone of second cage half 240 preferably has a value of less than HRC55. As well, alternate embodiments are possible in which second cage half 240 undergoes no heat treatment, or is alternately formed of a polymer rather than a metal. As well, in that first cage half 220 is preferably more resistant to drilling wear than second cage half 240, the radial width of roller pockets 228 defined by first cage half 220 in the radial direction (i.e., along an axis that is transverse to longitude center axis 102 and bisects a corresponding roller pocket) may be selected to be less than the radial width of roller pockets 248 defined by second cage half 240. As such, end faces 161 of roller elements 260 will preferably make contact with the adjacent portions of first cage half 220 rather than the softer second cage half 240. In contrast to the first embodiment shown in FIGS. 1A and 1B, the portions of first cage half 220 that the roller element end faces 161 make contact with are the outermost sidewalls 229 and innermost sidewalls 227 of roller pockets 228, as opposed to the inner surface 133 of the first cage half's second flange 132 (FIG. 1A). As such, additional surface treatments may be applied to the outermost and innermost sidewalls 229 and 227, respectively, of roller pockets 228 of first cage half 220 to further reduce friction, and therefore wear, between end faces 161 of the roller elements and the adjacent surfaces of roller pockets 228. Solid lubricants such as, but not limited to, PTFE (polytetrafluoroethylene) and MoS2 (molybdenum disulfide) may be used, and hard coatings such as, but not limited to, DLC (diamond like carbon) and TiN (titanium nitride) may be used.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A roller retainer cage for a roller thrust bearing, comprising:
   a first cage half including an annular portion, a first flange extending axially from an inner peripheral edge of the annular portion and a second flange extending axially from an outer peripheral edge of the annular portion; and
   a second cage half including an annular portion, a first flange extending axially from an inner peripheral edge of the annular portion and a second flange extending axially from an outer peripheral edge of the annular portion,
   wherein the first flange of the first cage half is disposed radially-outwardly of the first flange of the second cage half, the second flange of the first cage half is disposed radially-inwardly of the second flange of the second cage half, the first cage half is comprised of a through-hardened metal, and wherein the second cage half is comprised of a case carburized metal.

2. The roller retainer cage of claim 1, wherein the first cage half has an HRC hardness number of at least 55.

3. The roller retainer cage of claim 2, wherein the second cage half has an HRC hardness number less than 55.

4. The roller retainer cage of claim 1, wherein a radially inner surface of the second flange of the first cage half includes a treatment layer of one of polytetrafluoroethylene, molybdenum disulfide, diamond-like carbon and titanium nitride.

5. The roller retainer cage of claim 1 wherein:
   the annular portion of the first cage half defines a plurality of roller pockets; and
   the annular portion of the second cage half defines a plurality of roller pockets.

6. The roller retainer cage of claim 5, further comprising a plurality of roller elements, each roller element being rotatably received in a corresponding roller pocket of both the first cage half and the second cage half.

7. A roller thrust bearing, comprising:
   a first cage half including an annular portion defining a plurality of roller pockets, a first flange extending axially from an inner peripheral edge of the annular portion, and a second flange extending axially from an outer peripheral edge of the annular portion;
   a second cage half including an annular portion defining a plurality of roller pockets, a first flange extending axially from an inner peripheral edge of the annular portion, and a second flange extending axially from an outer peripheral edge of the annular portion; and
   a plurality of roller elements, each roller element being rotatably received in a corresponding roller pocket of both the first cage half and the second cage half,
   wherein the second flange of the first cage half is disposed radially-inwardly of the second flange of the second cage half, the first cage half is comprised of a through-hardened metal, and the second cage half is comprised of a case carburized metal.

8. The roller thrust bearing of claim 7 wherein the first flange of the first cage half is disposed radially-outwardly of the first flange of the second cage half.

9. The roller thrust bearing of claim 8, wherein the first cage half has an HRC hardness number of at least 55.

10. The roller thrust bearing of claim 9, wherein the second cage half has an HRC hardness number less than 55.

11. The roller thrust bearing of claim 8, wherein a radially outermost sidewall of each roller pocket of the first cage half includes a treatment layer of one of polytetrafluoroethylene, molybdenum disulfide, diamond-like carbon and titanium nitride.

* * * * *

UNITED STATES PATENT AND TRADEMARK OFFICE
CERTIFICATE OF CORRECTION

PATENT NO. : 11,353,060 B2
APPLICATION NO. : 16/761621
DATED : June 7, 2022
INVENTOR(S) : Yoshitaka Waseda et al.

It is certified that error appears in the above-identified patent and that said Letters Patent is hereby corrected as shown below:

On the Title Page

Item (72), after "Waseda," delete "Greenville, SC (US);" and insert --Aichi, Japan;--.

Item (56), under "OTHER PUBLICATIONS", Line 2, delete "PCT/US20171060180," and insert --PCT/US2017/060180,--.

Signed and Sealed this
Twenty-second Day of November, 2022

Katherine Kelly Vidal
*Director of the United States Patent and Trademark Office*